April 3, 1956   W. E. HAMMOND ET AL   2,740,614
CIRCUMFERENTIAL SEALING LEAVES
Filed Oct. 12, 1950
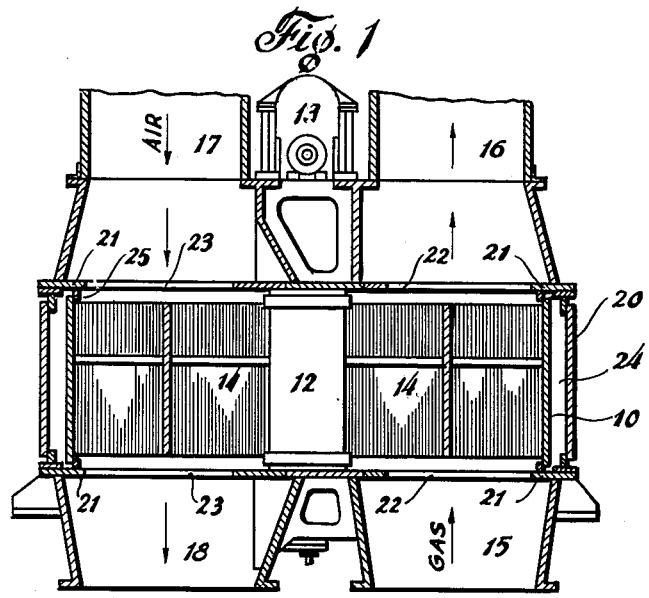
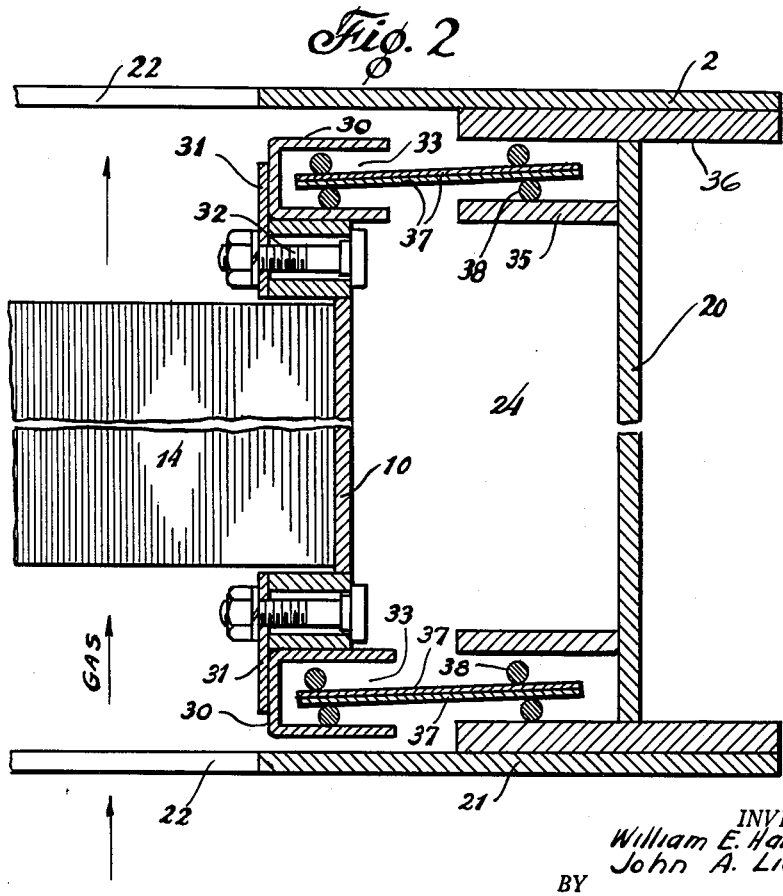
INVENTOR.
William E. Hammond
John A. Lidford
BY
ATTORNEY

United States Patent Office 2,740,614
Patented Apr. 3, 1956

2,740,614
CIRCUMFERENTIAL SEALING LEAVES

William E. Hammond, Wellsville, and John A. Lidford, Friendship, N. Y., assignors to The Air Preheater Corporation, New York, N. Y.

Application October 12, 1950, Serial No. 189,758

3 Claims. (Cl. 257—6)

The present invention relates to rotary regenerative air preheaters or like apparatus and particularly to improved circumferential seals for use between the rotor and the enclosing housing.

In a rotary regenerative heater of the Ljungstrom type a cylindrical rotor has compartments that carry heat transfer material which as the rotor turns is first exposed to the heating gases and then disposed in the air passage to impart the absorbed heat to the air. The rotor is surrounded by a housing having end or sector plates formed with openings to provide for the flow of gas and air and in order to preclude the flow of gas or air through the clearance space between the housing and the side of the rotor in a way to by-pass the heat transfer material it is customary to provide the rotor with circumferential seals that bear against the sector plates or other stationary parts.

The present invention contemplates improved circumferential sealing devices of novel forms that float with respect to the sector plates of the housing, being freely mounted on the ends of the rotor as will best be understood upon consideration of the following detailed description of an illustrative embodiment thereof when read in conjunction with the accompanying drawings in which:

Figure 1 is a sectional elevational view in diagrammatic form of a rotary regenerative air preheater embodying the present invention;

Figure 2 is an enlarged sectional elevational view showing the detailed construction of components of an illustrative type of sealing device.

In the drawings the numeral 10 designates the cylindrical shell of a rotor that is divided into sector shaped compartments by radial partitions connecting it with the rotor post 12 which is driven by a motor and reduction gearing 13 to turn the rotor slowly about its axis. The rotor compartments contain regenerative heat transfer material in the form of metallic plates 14 spaced to provide passages for the flow of gases from which they first absorb heat. The hot gases enter the preheater through a duct 15 from a boiler or other source and are discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through a duct 18. A housing 20 enclosing the rotor 10 is provided at either end opposite the latter with end or sector plates 21 which are apertured at 22 and 23 to permit the streams of gas and air to flow through the rotor of the preheater.

In order that the streams of gas and air may not by-pass the heat transfer surface 14 by flowing in the annular clearance space 24 between the rotor shell 10 and the housing 20 it is customary to provide circumferential seals on the shell 10 which wipe against imperforate portions of sector plates 21 or allied parts so as to seal off the space 24 at both ends of the rotor. According to the present invention the improved form of circumferential seals consists essentially of channel members or the like mounted on the rotor shell and on the housing at or adjacent the ends of the rotor and providing confronting grooves which receive the circumferentially extending edge portions of flexible, annular sealing strips or leaves that close the spaces 24 between the housing 20 and rotor shell 10 at both ends of the latter. In the embodiment selected for illustration in Figure 2 channel members 30 bent to continuous circular form are mounted on the upper and lower circumferential end edges of the rotor shell 10 by means of backing strips 31 which are bolted to the shell. The circular channel members 30, which may be either continuous or abutting arcuate segments, are so mounted that the open end or groove 33 of the channel faces the surrounding housing 20. Mounted on the inner side of both upper and lower sector plates and as specifically shown are annular plates 35 of continuous or arcuate form spaced axially with respect to the upper and lower housing flanges 36 so as to form with the latter and the inner wall of the housing a channel-like structure providing grooves 34 facing the grooves 33 of the channel members 30 on the rotor shell 10. The channels 33 and 34 on rotor and housing respectively, are in confronting relation opposite each other, but as is shown they are not necessarily in actual registration. Extending completely around the rotor in arcuate segmental form are the imperforate sealing leaves 37 whose circumferentially extending marginal edge portions extend into the grooves 33 and 34 on the rotor and housing so that the bodies of these leaves completely bridge the space 24 between the rotor and housing at both ends of the rotor all around the latter. Adjacent their edges the sealing leaves 37 are preferably provided with wear rings 38 facing the side walls of the channel grooves 33, 34 and held in contact with one or the other of these side walls by the differential pressure existing across the rotor. These seals 37 fully close off the space 24 at the ends of the rotor and are floating so as to compensate for distortions of the rotor or housing by a pivoting action of the seals on the rings 38 that bear against the walls of the channel members on rotor shell and housing.

It should be remarked that Figure 2 does not embody a true representation of the relative proportions of the rotor shell 10 and the channels 30 together with its mountings, the sizes of the latter being exaggerated to provide a clear illustration that will be readable when the Figure is reproduced on a reduced scale.

What we claim is:

1. A circumferential seal for use in a rotary air preheater comprising two relatively rotatable concentric members; an annular groove on each of said members each having a bottom and side walls; said grooves opening substantially radially toward each other; a thin planar annular sealing member having radially extending faces and arcuately divided into segments extending circumferentially between said members with its circumferential edges extending into said grooves; and circumferential wear rings abutting the faces of the annular sealing member to contact the wall portions of said grooves and provide a floating action which compensates for the distortions of the relatively rotatable members by permitting a pivoting action of the sealing member on any of the wear rings that bear against the walls of the grooves on the relatively rotatable members.

2. A circumferential seal as defined in claim 1 wherein the inner diameter of the annular sealing member is substantially greater than the inner diameter of the adjacent groove.

3. A circumferential seal as defined in claim 1 wherein the bottoms of the grooves are radially spaced to permit a substantial relative radial movement of the relatively rotatable members.

References Cited in the file of this patent

UNITED STATES PATENTS

| | | |
|---|---|---|
| 1,293,938 | Ross | Feb. 11, 1919 |
| 1,652,025 | Ljungstrom | Dec. 7, 1927 |
| 1,891,706 | De Ram | Dec. 20, 1932 |
| 2,113,047 | French | Apr. 5, 1938 |
| 2,124,526 | Goldsworthy | July 26, 1938 |
| 2,233,599 | Gilbert | Mar. 4, 1941 |
| 2,257,119 | Johannesen | Sept. 30, 1941 |
| 2,396,319 | Edwards et al. | Mar. 12, 1946 |
| 2,471,995 | Yerrick et al. | May 31, 1949 |
| 2,480,277 | Yerrick | Aug. 30, 1949 |

FOREIGN PATENTS

| | | |
|---|---|---|
| 268,287 | Switzerland | May 15, 1950 |
| 696,639 | Germany | Aug. 29, 1940 |
| 970,696 | France | Jan. 8, 1951 |